United States Patent
Hoekman et al.

(10) Patent No.: US 8,494,323 B2
(45) Date of Patent: Jul. 23, 2013

(54) OPTICAL SYSTEM HAVING A SYMMETRICAL COUPLING REGION FOR COUPLING LIGHT BETWEEN WAVEGUIDES INCLUDING AN OPTICALLY RESONANT ELEMENT

(75) Inventors: Marcel Hoekman, Enschede (NL);
Rene Gerrit Heideman, Oldenzaal (NL); Albert Prak, Enschede (NL)

(73) Assignee: Octrolix BV (NL)

( * ) Notice: Subject to any disclaimer, the term of this patent is extended or adjusted under 35 U.S.C. 154(b) by 295 days.

(21) Appl. No.: 12/955,403

(22) Filed: Nov. 29, 2010

(65) Prior Publication Data

US 2012/0134628 A1    May 31, 2012

(51) Int. Cl.
*G02B 6/26* (2006.01)
*H01S 3/00* (2006.01)
(52) U.S. Cl.
USPC .......................................... 385/50; 359/341.1
(58) Field of Classification Search
USPC ............... 385/58, 2, 8, 25, 27, 28, 37, 50, 30, 385/32, 39; 359/341.1, 341.5
See application file for complete search history.

(56) References Cited

U.S. PATENT DOCUMENTS

| | | | |
|---|---|---|---|
| 4,720,160 A * | 1/1988 | Hicks, Jr. .......................... | 385/31 |
| 6,195,187 B1 | 2/2001 | Soref et al. | |
| 7,146,087 B2 * | 12/2006 | Heideman et al. ............ | 385/131 |
| 7,519,240 B1 * | 4/2009 | Little et al. ........................ | 385/1 |
| 7,580,596 B1 * | 8/2009 | Meijer et al. ....................... | 385/8 |
| 8,054,669 B2 * | 11/2011 | Meijer et al. .................... | 365/119 |
| 2004/0257564 A1 | 12/2004 | Madsen | |
| 2005/0024716 A1 * | 2/2005 | Nilsson et al. ............ | 359/341.31 |
| 2005/0152660 A1 | 7/2005 | Heideman et al. | |
| 2009/0016738 A1 * | 1/2009 | Von Lerber et al. .......... | 398/155 |

FOREIGN PATENT DOCUMENTS

| | | |
|---|---|---|
| EP | 1037096 A2 | 9/2000 |
| WO | 0072065 A1 | 11/2000 |
| WO | 2009012414 A2 | 1/2009 |

OTHER PUBLICATIONS

Wolf, Steffen, "EP Application No. 11190709.3 Extended European Search Report Mar. 29, 2012", , Publisher: EPO, Published in: EP.

* cited by examiner

*Primary Examiner* — Akm Enayet Ullah
(74) *Attorney, Agent, or Firm* — Kaplan Breyer Schwarz & Ottesen, LLP (57) ABSTRACT

A system having an optical-coupling region for evanescently coupling light between first and second optical-waveguiding structures is disclosed. Within the optical-coupling region, the first and second optical-waveguiding structures exhibit mirror symmetry with respect to each other across or about at least one of a plane and an axis and include a segment that is not straight.

19 Claims, 6 Drawing Sheets

OPTICAL SYSTEM HAVING A SYMMETRICAL COUPLING REGION FOR COUPLING LIGHT BETWEEN WAVEGUIDES INCLUDING AN OPTICALLY RESONANT ELEMENT

FIELD OF THE INVENTION

The present invention relates to coupled waveguiding elements.

BACKGROUND OF THE INVENTION

A micro-resonator is a single, uninterrupted, integrated optical waveguide element in the form of a closed loop that supports at least one resonant mode. The resonance wavelength(s) of the resonator is (are) a function of its optical length (i.e., path length and refractive index). The loop can be circular, "race track" (i.e., oval), elliptical, or even have an arbitrarily curved circumference.

Figure 1:
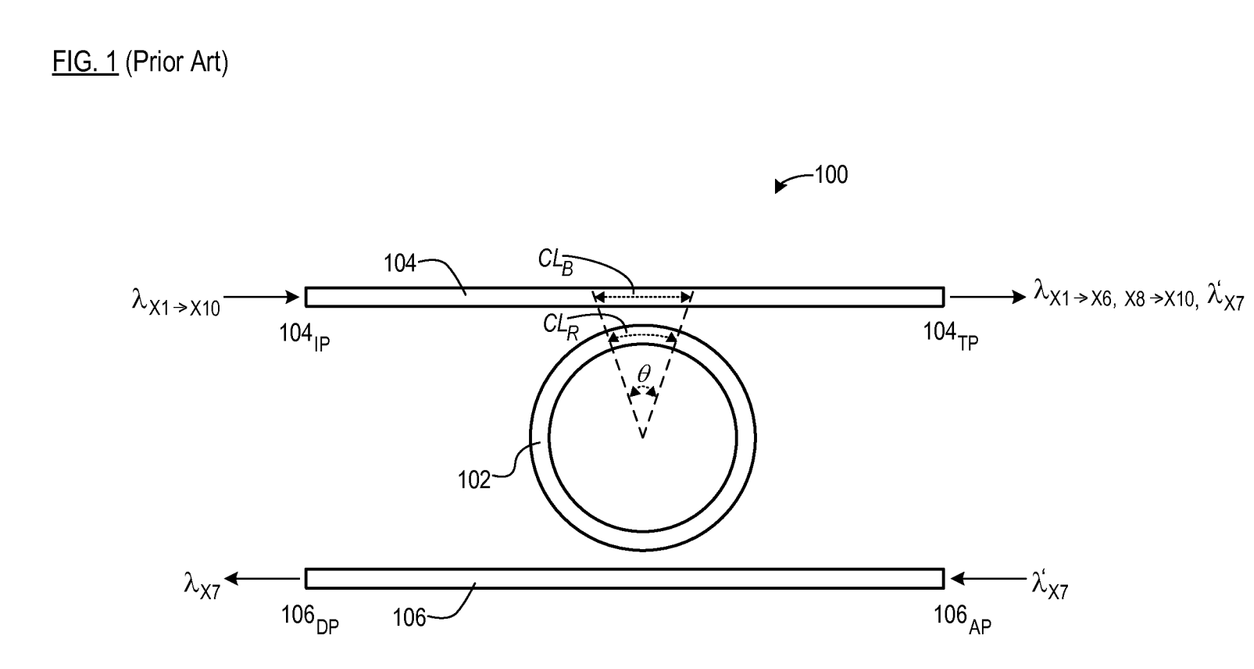
FIG. 1 depicts a top view of a conventional laterally coupled, four-port integrated micro-resonator.

The micro-resonator, which is often called a "ring resonator," is typically used in conjunction with one or more linear waveguide regions. For example, FIG. 1 depicts a conventional four-port micro-resonator system (integrated micro-resonator") 100 including loop waveguide 102 and two linear or "bus" waveguides 104 and 106. Bus waveguide 104 includes input port $104_{IP}$ and through port $104_{TP}$. Bus waveguide 106 includes drop port $106_{DP}$ and add port $106_{AP}$. A portion of each of bus waveguides 104 and 106 is adjacent and tangential to loop waveguide 102.

As a consequence of geometrical and other considerations, a portion of "on-resonance" light (light having the same wavelength as the one or more resonant wavelengths of the resonator) that is traveling along either of the bus waveguides (e.g., waveguide 104) couples to loop waveguide 102. A portion of that coupled light is, in turn, coupled to the other of the bus waveguides (e.g., waveguide 106). Light within the linear waveguides that is off-resonance (i.e., not at a resonance wavelength) bypasses the loop with only a small transmission loss (in theory, there is no loss).

As an example of the operation of conventional four-port micro-resonator 100, a multi-wavelength optical signal $\lambda_{X1 \ to \ X10}$ is launched into input port $104_{IP}$. All wavelengths of the signal remain in bus waveguide 104 and travel to through port $104_{TP}$ except for wavelength(s) that are on-resonance with the loop 102. In this example, loop 102 is assumed to have a resonance at wavelength X7. As a consequence, light having wavelength X7 in the multi-wavelength optical signal couples to loop 102 and then to bus waveguide 106 traveling in the direction indicated toward drop port $106_{DP}$. In this fashion, the information contained in the signal at wavelength X7 is "dropped" from bus waveguide 104. Those skilled in the art will appreciate that the foregoing explanation is a simplification of the operation of the resonator (e.g., light makes multiple round trips around the loop before exiting, so there is interference within the loop, etc.).

Add port $106_{AP}$ can be used to incorporate new data in the multi-wavelength signal that is traveling along bus waveguide 104. For example, in FIG. 1, a new signal $\lambda'_{X7}$, which has wavelength X7, is launched into add port $106_{AP}$ of bus waveguide 106. Since signal $\lambda'_{X7}$ is on-resonance (with loop 102), it will coupled to loop 102 and then to bus waveguide 104 traveling in the direction of the original multi-wavelength single. As a consequence, multi-wavelength optical signal $\lambda_{X1 \ to \ X6, X8 \ to \ X10}$ and optical signal $\lambda'_{X7}$ proceed to through-port through port $104_{TP}$.

The integrated micro-resonator can, therefore, effectively function as a highly-selective wavelength-dependent optical coupler to form optical "components" such as filters, routers, switches, and the like.

There are primarily three requirements for proper functioning of a micro-resonator: (1) a resonance condition, (2) a phase-matching condition, and (3) an evanescent field-coupling condition. These are explained further below.

Condition 1. The resonance condition results from constructive interference of light based on the optical round trip length ("ORTL") of the closed loop.

Condition 2. The coupling of light between the loop and straight waveguides occurs within a "coupling length" (the length of the optical path over which coupling takes place). With continuing reference to FIG. 1, on-resonance light (i.e., light at wavelength X7) that is traveling in waveguide 104 couples, over optical path length $CL_B$, to loop 102 over optical path length $CL_R$. Over the arc angle θ, the coupled light will be out of phase due to the difference in optical path length: $\Delta_{OPL} = CL_B - CL_R$. It will be appreciated to those skilled in the art that the foregoing explanation of "phase mismatch" is necessarily simplified. A more rigorous treatment would involve the angle of the phase fronts of the propagating optical modes in loop 102 and bus 104 and other considerations.

Condition 3. In implementations such as integrated micro-resonator 100, light energy couples into and out of the loop waveguide via evanescent field coupling. An evanescent optical field is the portion of the optical field of guided light that extends beyond the physical surface of a waveguide. There must be enough overlap between the modes in waveguides at the coupling region in order for coupling to occur. Since the evanescent field does not extend far, loop waveguide 102 must be placed in close proximity to the linear waveguides for coupling.

The aforementioned three requirements lead to certain conventional wisdom and practice concerning micro-resonators.

At telecom wavelengths (about 1550 nanometers), a certain free spectral range ("FSR") is required and that dictates the ORTL required for resonance. In prior art designs, this has resulted in a trade-off between the required ORTL, minimum bend radius for the loop, and acceptable bend loss. Ultimately, this trade-off favors making the geometrical round trip length ("GRTL") as small as possible at telecom wavelengths. As a consequence, most loops that operate at telecom wavelengths are truly circular; that is, not a "race track" or other geometry.

This predilection for small GRTL at telecom wavelengths has typically resulted in integrated micro-resonators that use straight bus waveguides or, less frequently, waveguides that bend in the direction of the loop in order to increase coupling efficiency. This leads to the phase mismatch discussed above. To correct the phase-mismatch, it is known to adjust the loop waveguide (e.g., alter width and/or height, etc.) relative to the bus waveguides. This results in a change in the velocity of light through the loop, which effectively adjusts for the path length difference $\Delta_{OPL}$. But making such an adjustment necessarily causes an asymmetry of another property (e.g., width, height, etc.) between the bus waveguides and the loop.

The coupling process is intrinsically wavelength dependent, because for a given GRTL, the optical coupling length depends on wavelength and coupling factor (i.e., the fraction of optical power of a signal that is transferred between the loop and adjacent waveguide). The adjustment to correct for path length described above simply exacerbates the wavelength dependence.

At telecom wavelengths (about 1550 nanometers), wavelength dependence is not a significant issue; the primary focus is to achieve a round-trip length that is acceptably small. In US 2004/0008948, for example, an oval resonance device is disclosed that is intended to address the problem of phase mismatch. According to the reference, the oval shape of the resonator provides straight sides that are disposed adjacent and parallel to the linear input and output waveguides. Coupling occurs mainly in this straight portion of the oval resonator, such that the path-length differences and, hence, phase-mismatch as described above are reduced. Furthermore, according to the reference, the coupling length can be readily changed (by altering the length of the straight portion of the oval resonator). This enables oval resonators with the same width to operate with different coupling factors, as desired.

Of course, some coupling will occur beyond the straight portions, such that there will be some level of phase mismatch. Also, this solution to the problem of phase mismatch requires, of course, that the resonator be in the shape of an oval or "race-track." Perhaps most significantly, at least in the context of telecom wavelengths, the race-track geometry effectively lengthens RTL (unless a material system is used that enables minimum bending radii that are suitably small). As previously discussed, the requirements for proper resonator operation prompt a small GRTL, which dictates a circular resonator, not an oval.

At lower-than-telecom wavelengths, such as datacom wavelengths (about 850 nanometers) and sensor wavelengths (typically between 405 to 850 nanometers), the wavelength dependence of the coupling factor becomes an important consideration. In fact, the present inventors found that micro-resonator devices they produced for operation at 850 nanometers operation were not functioning properly.

As a consequence, a need exists for a way to optically couple an optically-resonant waveguiding element to another optical waveguiding element that avoids or decreases phase mismatch issues while, at the same time, avoids or mitigates the wavelength-dependent behavior of the coupling factor.

SUMMARY OF THE INVENTION

The present invention provides a new "symmetric" geometry for an optical-coupling region in a system comprising an optically-resonant element. The symmetric optical-coupling region is structured to avoid phase mismatch and also reduce the problem of the wavelength dependence of the coupling factor. Furthermore, the new geometry imposes no limitations on the geometry of the optically-resonant element. Because the coupling factor is less-wavelength dependent, manufacturing tolerances can be relaxed and greater reproducibility can be achieved.

In accordance with the illustrative embodiment, the symmetric optical-coupling region comprises a segment from each of two optical waveguiding elements that are close enough to support evanescent field coupling and wherein:

(1) the segments comprise substantially identical waveguiding characteristics (width, material, refractive index, etc.);
(2) the segments include a portion that is not straight; and
(3) the segments exhibit mirror symmetry with respect to each other about a plane (for laterally-coupled waveguiding elements) or about an axis (for vertically-coupled waveguiding elements).

In a typical embodiment of the invention, an optical waveguide in the form of a loop and having one or more resonance wavelengths is associated with two bus waveguides to form an integrated micro-resonator. A first symmetric optical-coupling region is formed between the one of the bus waveguides and the loop and a second symmetric optical-coupling region is formed between the other of the bus waveguides and the loop.

DETAILED DESCRIPTION

Figure 2:
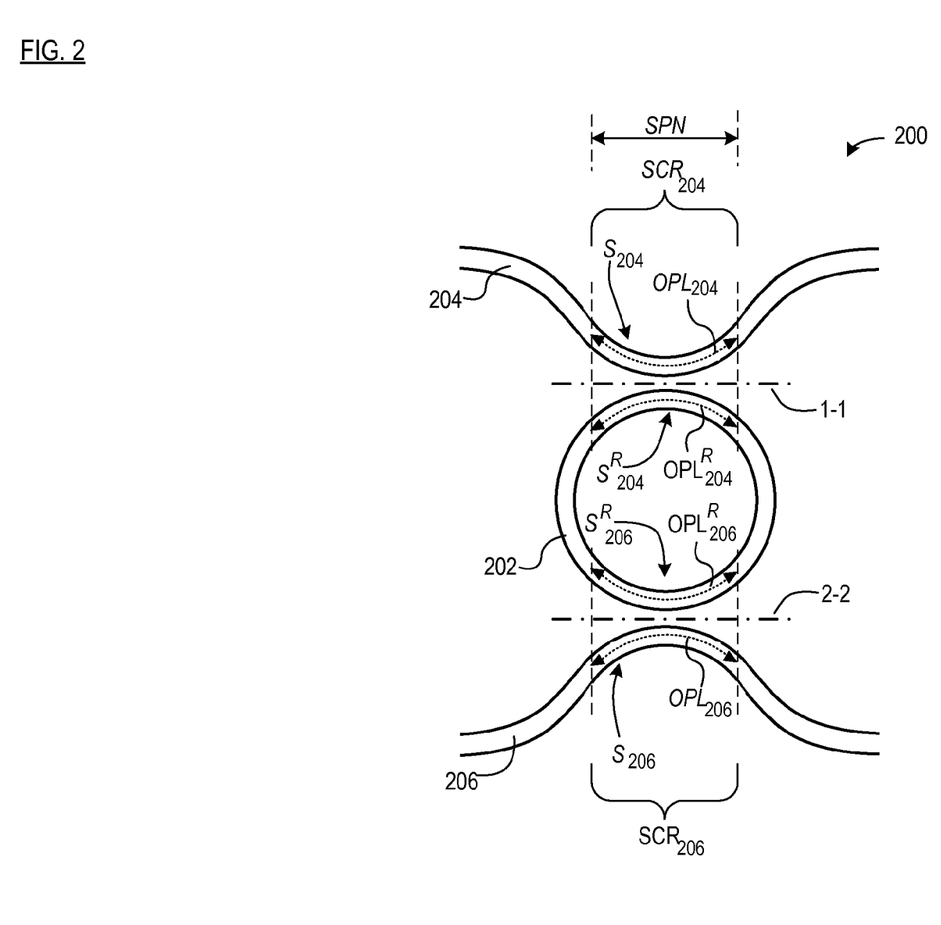
FIG. 2 depicts a laterally coupled, integrated micro-resonator having equal symmetric coupling regions in accordance with the illustrative embodiment of the present invention.

FIG. 2 depicts integrated micro-resonator 200 having symmetric coupling regions in accordance with the illustrative embodiment of the present invention. The integrated micro-resonator includes loop waveguide 202, bus waveguide 204, and bus waveguide 206.

It is desirable for loop waveguide 202 to be very small so that: (i) its free spectral range is large and (ii) it occupies very little physical space, thereby enabling large-scale integration. In fact, a typical loop waveguide for an integrated micro-resonator has a diameter that is only one or two orders of magnitude greater than its operating wavelength. So, for a datacom application having an operating wavelength of about 850 nanometers, loop diameter is usually in the range of about 10 microns to about 100 microns.

To guide light around the tight radius of curvature of loop waveguide 202, the dielectric contrast (i.e., difference in refractive indices) between the loop waveguide and surrounding medium in the plane must be large. The loop and bus waveguides of micro-resonators are usually fabricated in materials systems such as Si/SiO2, GaAs/AlGaAs, and Si3N4/SiO2 to facilitate their incorporation into optical systems.

Embodiments of the present invention are independent of waveguide specifics, such as waveguide configuration and/or materials. That is, loop waveguide 202 and bus waveguides 204 and 206 can be configured in any of a variety of known forms, including, without limitation, stripe, ridge, or box, as are well known in the art. The waveguides can be formed from any of a number of conventionally-used materials, including various glasses and semiconductors. In some embodiments, the waveguides comprise a composite guiding region including an inner core of stoichiometric silicon oxide ($SiO_2$) and an outer core of stoichiometric silicon nitride ($Si_3N_4$) and a cladding region of silicon dioxide. This materials system is described in further detail later in this specification in conjunction with FIG. 5. Although myriad possibilities are available, the same configuration and same materials system should be chosen for loop waveguide 202 and bus waveguides 204 and 206. Typical applications will require that bus waveguides 204 and 206 are single mode waveguides.

Table 1 below provides a glossary for some of the identifiers used in FIG. 2.

TABLE 1

Glossary for FIG. 2

| CALL OUT | DESCRIPTION |
|---|---|
| $SCR_{204}$ | Symmetric Coupling Region for bus waveguide 204 and loop 202. |
| $S_{204}$ | Segment of bus waveguide 204 within coupling region $CR_{204}$. |
| $OPL_{204}$ | Optical Path Length through segment $S_{204}$ |
| $S^R_{204}$ | Segment of loop waveguide 202 within coupling region $SCR_{204}$. |
| $OPL^R_{204}$ | Optical Path Length through segment $S^R_{204}$ |
| $SCR_{206}$ | Symmetric Coupling Region for bus waveguide 206 and loop 202. |
| $S_{206}$ | Segment of bus waveguide 206 within coupling region $SCR_{206}$. |
| $OPL_{206}$ | Optical Path Length through segment $S_{206}$ |
| $S^R_{206}$ | Segment of loop waveguide 202 within coupling region $CR_{206}$. |
| $OPL^R_{206}$ | Optical Path Length through segment $S^R_{206}$ |

Unlike conventional integrated micro-resonators, bus waveguides 204 and 206 of integrated micro-resonator 200 are curved, at least in respective symmetric coupling regions $SCR_{204}$ and $SCR_{206}$. In fact, within each coupling region, the bus waveguides have the same radius of curvature as loop 202, although they curve in the opposite direction as the loop. That is, segment $S_{204}$ of bus waveguide 204 is the "mirror image" of segment $S^R_{204}$ of loop 202. Likewise, segment $S_{206}$ of bus waveguide 206 is the "mirror image" of segment $S^R_{206}$ of loop 202. Stated somewhat differently, segment $S_{204}$ and segment $S^R_{204}$ exhibit mirror-image symmetry about plane 1-1 and segment $S_{206}$ and segment $S^R_{206}$ exhibit mirror-image symmetry about plane 2-2. The symmetry planes 1-1 and 2-2 are oriented such the surface of the plane extends "into" and "out of" the figure. In other words, FIG. 2 depicts a view of an "edge" of each plane.

Because segment $S_{204}$ of bus waveguide 204 and segment $S^R_{204}$ of loop 202 are mirror images of one another, they necessarily have the same length. Since, in the illustrative embodiment, the width, refractive index, etc., of bus waveguide 204 and loop waveguide 202 are the same, the optical path length $OPL_{204}$ of light in segment $S_{204}$ of the bus waveguide equals path length $OPL^R_{204}$ of light in segment $S^R_{204}$ of the loop waveguide. The same is true for light traveling through segment $S_{206}$ of bus waveguide 206 and segment $S^R_{206}$ of loop 202. Since the optical path length through the bus and loop waveguides within each symmetric coupling region are the same, the phase mismatch that arises from conventional "non-symmetric" coupling regions (see FIG. 1) is avoided.

As previously indicated, the segment of the bus waveguide and the segment of the loop waveguide within a given symmetric coupling region must exhibit mirror-image symmetry. Span SPN of the symmetric coupling region for any given system is a function of waveguide specifics, the gap between the bus and loop waveguides, and properties of the optical signal. Simply put, when two waveguides are far enough apart under the prevailing conditions that the evanescent tail of the optical signal traveling in one waveguide does not sufficiently overlap the other waveguide, coupling does not occur. This defines the extremes of the coupling region. The determination of the span of the coupling region is within the capabilities of those skilled in the art.

Figure 3:
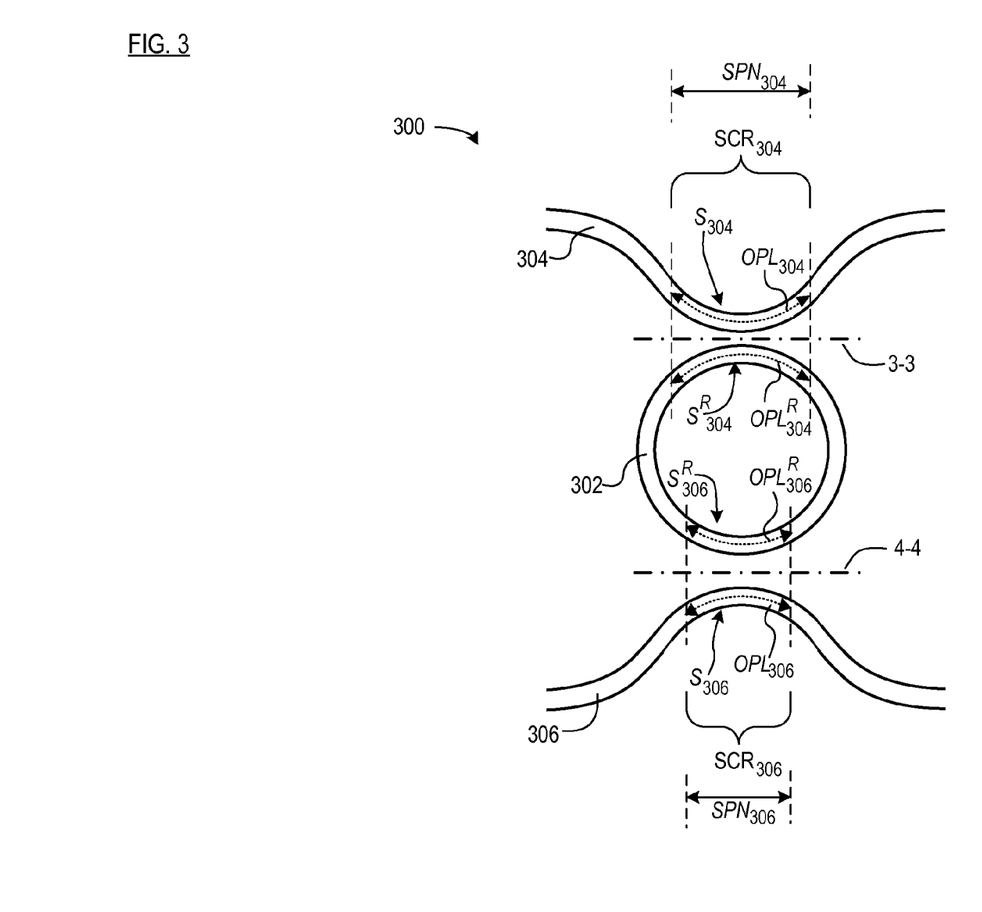
FIG. 3 depicts an alternative embodiment of a laterally coupled, integrated micro-resonator having un-equal symmetric coupling regions in accordance with the present teachings.

In integrated micro-resonator 200, the span of symmetric coupling regions $SCR_{204}$ and $SCR_{206}$ is the same. FIG. 3 depicts integrated micro-resonator 300 wherein the symmetric coupling regions have different spans.

Integrated micro-resonator 300 includes loop waveguide 302, bus waveguide 304, and bus waveguide 306. The (varying) gap between bus waveguide 304 and loop waveguide 302 is different than the (varying) gap between bus waveguide 306 and loop waveguide 302. As a consequence, span $SPN_{304}$ of symmetric coupling region $SCR_{304}$ and span $SPN_{306}$ of symmetric coupling region $SCR_{306}$ are not equal.

Within symmetric coupling region $SCR_{304}$, optical path length $OPL_{304}$ of light traveling within segment $S_{304}$ of bus waveguide 304 and optical path length $OPL^R_{304}$ of light traveling within segment $S^R_{304}$ of loop waveguide 302 are equal. And within symmetric coupling region $SCR_{306}$, optical path length $OPL_{306}$ of light traveling within segment $S_{306}$ of bus waveguide 306 and optical path length $OPL^R_{306}$ of light traveling within segment $S^R_{306}$ of loop waveguide 302 are equal. But the optical path length through the segments within symmetric coupling region $SCR_{304}$ and the optical path length through the segments within symmetric coupling region $SCR_{306}$ are not equal. This will not, however, cause any phase mismatch. As long as the optical path length for the bus and loop waveguides within any given symmetric coupling region are the same, phase mismatch is avoided.

It will be appreciated that there are other ways to create "unequal" symmetric coupling regions as depicted in FIG. 3. For example and without limitation, rather than varying the gap between the bus and loop waveguides, the width of the waveguide(s) can be altered or the minimum radius of curvature can be changed.

Figure 4A:
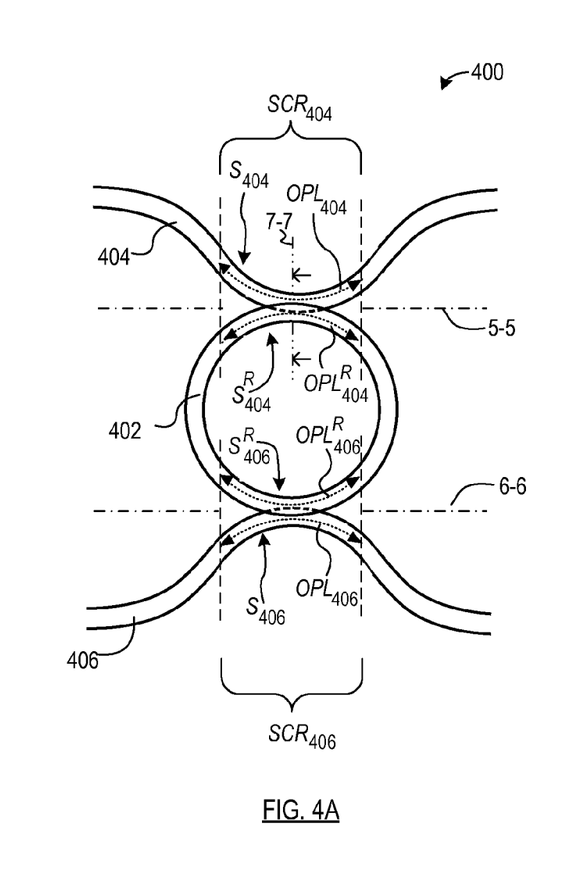
FIG. 4A depicts a vertically coupled integrated micro-resonator having symmetric optical-coupling regions in accordance with the present teachings.
Figure 4B:
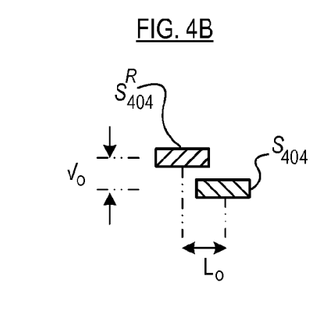
FIG. 4B depicts a sectional view of the integrated micro-resonator of FIG. 4A in accordance with the present teachings.

FIG. 4A depicts a top view of integrated micro-resonator 400 in accordance with the present teachings. FIG. 4B depicts a sectional view through line 7-7 in FIG. 4A and in the direction shown. Unlike integrated micro-resonators 200 and 300, in which the loop and bus waveguides are laterally coupled, micro-resonator 400 comprises vertically-coupled loop 402 and bus waveguides 404, 406.

As depicted in FIGS. 4A and 4B, the bus waveguides and loop waveguide are laterally offset as well as vertically offset. In particular, and with reference to FIG. 4B, segment $S_{404}$ of bus waveguide 404 is vertically offset from segment $S^R_{404}$ of loop waveguide 402 by an amount $V_o$. And segment $S_{404}$ of bus waveguide 404 is laterally offset from segment $S^R_{404}$ of loop waveguide 402 by an amount $L_o$. Segment $S_{406}$ of bus waveguide 406 is likewise vertically and laterally offset from loop waveguide 402.

In accordance with the present teachings, the waveguide segments within symmetric coupling regions $SCR_{404}$ and $SCR_{406}$ demonstrate the mirror-image symmetry disclosed for the previous embodiments. Mathematical analysis reveals that in the case of an integrated micro-resonator having vertically-coupled waveguides, such as integrated micro-resonator 400, there is a symmetry axis, rather than a symmetry plane. This symmetry axis, which is identified as axis 9-9 for symmetric coupling region $SCR_{404}$, is identified in FIG. 4C. Symmetry axis 9-9 lies at the horizontal and vertical midpoint between segment $S^R_{404}$ of loop waveguide 402 and segment $S_{404}$ of bus waveguide 404. Symmetry axis 9-9 is oriented such that is directed "out of the page" at the point at which axes 7-7 and 8-8 intersect. Although the actual waveguide layout does not have a symmetry plane, the "projection" of the layout (i.e., the rendering of the system as depicted in FIG. 4A) does. In particular, the projection of segments $S_{404}$ and $S^R_{404}$ exhibit mirror-image symmetry about plane 5-5 and projection of segments $S_{406}$ and $S^R_{406}$ exhibit mirror-image symmetry about plane 6-6.

Figure 5:
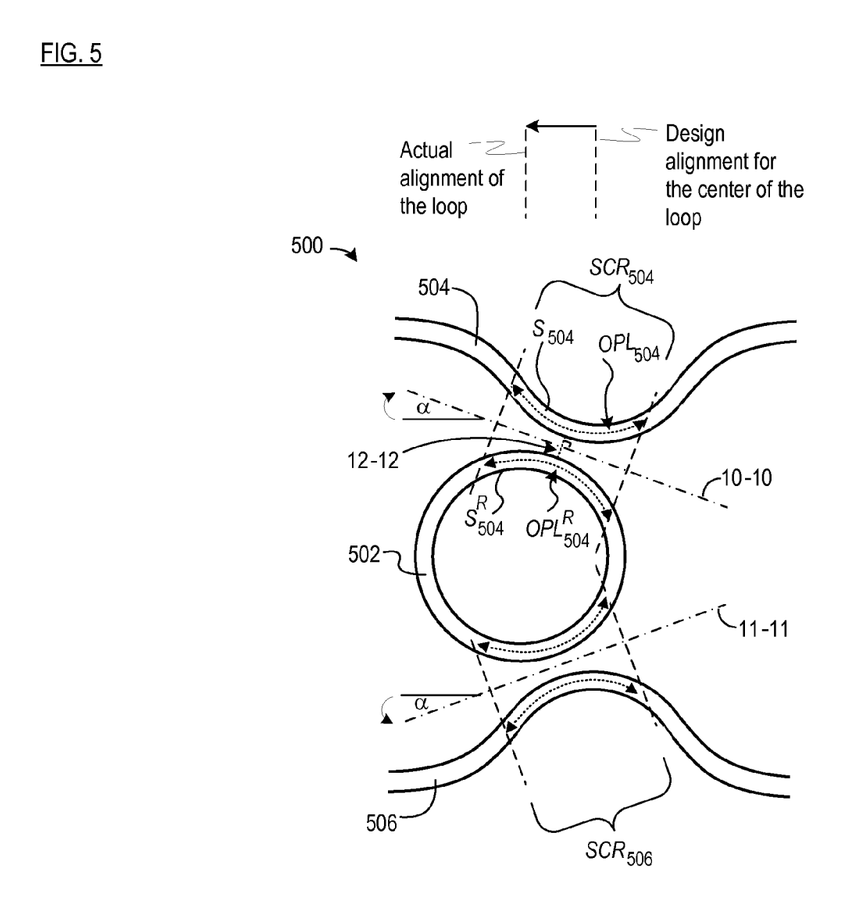
FIG. 5 depicts a laterally coupled, integrated micro-resonator in accordance with the illustrative embodiment of the present invention wherein the loop and bus waveguides are misaligned.

The integrated micro-resonators that have been previously discussed were assumed to exhibit perfect alignment (i.e., between loop and bus waveguides). When a suitable lithography technique (e.g., stepper lithography, etc.) is used to pattern the waveguides, this assumption is reasonable. If, however, a less-precise technique is used to pattern the waveguides, such as contact lithography, then some amount of misalignment in the desired position of the loop waveguide, one or both bus waveguides, or both the loop and the bus waveguides is expected. For example, misalignment when using contact lithography will be about +/−1 to 2 microns. FIG. 5 depicts such a case of misalignment in a laterally-coupled micro-resonator.

As depicted in FIG. 5, laterally-coupled integrated micro-resonator 500 exhibits horizontal misalignment wherein loop 502 is shifted "left" of its design location. This misalignment causes the symmetry planes (i.e., plane 10-10 and plane 11-11) to rotate over angle α (i.e., with respect to embodiments in which "perfect" alignment of the loop and bus waveguides would locate the symmetry planes in a "horizontal" orientation, such as depicted in FIG. 2). The following discussion, which addresses symmetric coupling region $SCR_{504}$ applies as well to $SCR_{506}$. For the sake of brevity, only the former region is discussed.

The "angle" of symmetry plane 10-10 is determined at the location of closest approach between segment $S^R_{502}$ of loop 502 and segment $S_{504}$ of bus waveguide 504. Specifically, the symmetry plane is oriented orthogonally with respect to a line (i.e., line 12-12) extending between those segments at their closest approach. If waveguide segments $S^R_{502}$ (loop) and $S_{504}$ (bus) have a constant bend radius (i.e., are circular), then they will exhibit the desired mirror-image symmetry notwithstanding the misalignment of the waveguides. As such, some embodiments of the present invention are far more tolerant of misalignments than prior-art designs.

Only a portion of waveguide 504 exhibits a region of constant bend radius. Thus, as loop 504 moves further out of alignment, there comes a point at which the coupling region (which is a function of the proximity of the loop and bus waveguide) will extend beyond the region of constant bend radius. In fact, in FIG. 5, misalignment of loop 502 causes the "left" side of coupling region $SCR_{504}$ to extend beyond the region of constant bend radius. As such, mirror symmetry is lost. And as the deviation from mirror-image symmetry increases, the deviation in optical path length $OPL_{504}$ and optical path length $OPL^R_{504}$ increases. Accompanying increases in these deviations are an increase in phase mismatch and an increase in the wavelength dependence of the coupling factor. But the effect of such deviation is incremental; that is, near mirror-image symmetry results in less phase mismatch and less wavelength dependence than prior-art arrangements, such as conventional micro-resonator 100 (FIG. 1) that couples a loop waveguide to straight bus waveguides (see, e.g., FIG. 1).

Figure 4C:
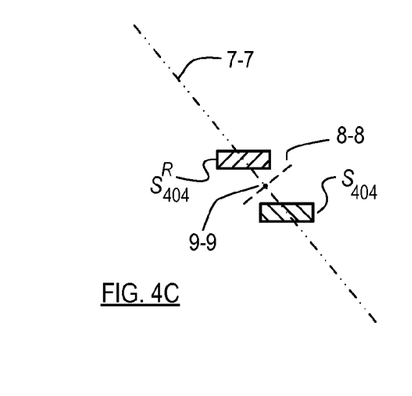
FIG. 4C depicts the sectional view of FIG. 4B and further shows an axis of symmetry.

Insensitivity (or decreased sensitivity) to misalignment applies to vertically-coupled integrated micro-resonators as well (see, e.g., FIGS. 4A-4C). In such resonators, the misalignment can be in the horizontal direction, vertical direction, or both directions. But as long as the coupling region of the waveguides exhibits constant bend radius, mirror-image symmetry can be maintained about a symmetry axis.

It is to be understood that embodiments of the invention do not require a constant bend radius in the coupling regions of waveguides. Rather, what is required for those regions is mirror-image symmetry. But to the extent that there is not a constant bend radius in the coupling region, a misalignment between coupled waveguides is likely to result in greater phase mismatch and wavelength sensitivity than for constant-bend-radius coupling regions.

As previously indicated, optical systems that incorporate the symmetric coupling region disclosed herein will include, in some embodiments, waveguides that comprise a composite guiding region including an inner core of stoichiometric silicon oxide ($SiO_2$) and an outer core of stoichiometric silicon nitride ($Si_3N_4$) and a cladding region of silicon dioxide. Although this is the preferred waveguide-materials system, the symmetric coupling region can be used in conjunction with any waveguide-materials system.

Figure 6:
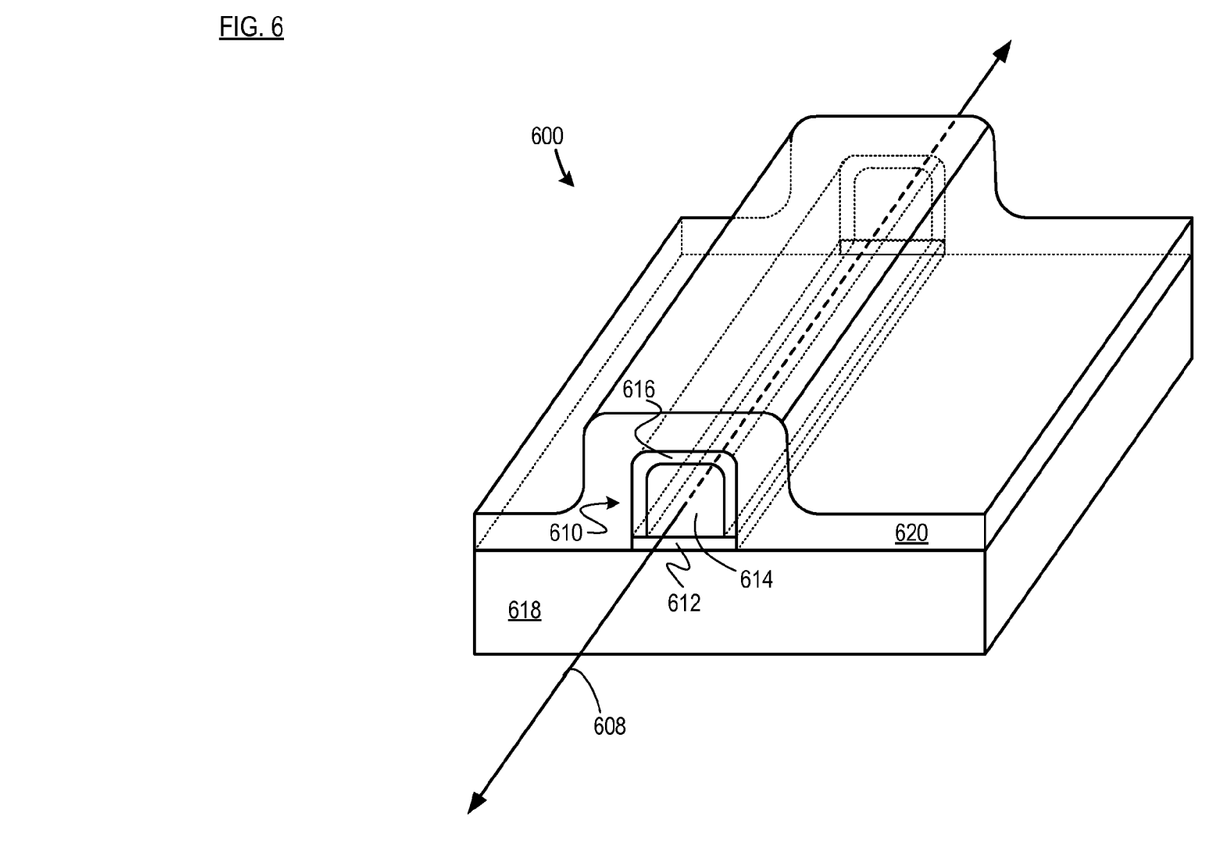
FIG. 6 depicts a preferred materials system for waveguides used in conjunction with the illustrative embodiment.

FIG. 6 depicts a perspective view of a portion of box waveguide 600 that includes the preferred waveguide-materials system. Box waveguide 600 has an axis of signal propagation 608. The box waveguide comprises composite guiding region 610, which is surrounded by lower cladding layer 618 and upper cladding layer 620. The material(s) that compose the lower cladding layer and the upper cladding layer have a refractive index that is lower than the materials that compose composite guiding region 610. By virtue of this difference in refractive indices, the lower and upper cladding layers serve to confine propagating light to composite guiding region 610.

As depicted in FIG. 6, composite guiding region 610 comprises layers 612, 614, and 616. Layers 612 and 616 sandwich interposed layer 614. Composite guiding region 610 is itself sandwiched by lower cladding layer 618 and upper cladding layer 620.

Composite guiding region 610 can also be described as including an inner core (i.e., layer 614) and an outer core, wherein the outer core includes a lower portion (i.e., layer 612) and side/upper portion (i.e., layer 616). Layers 612 and 616 can have different thicknesses.

Box waveguide 600 can be formed as follows. First, a lower cladding layer (e.g., lower cladding layer 618 in FIG. 6) is formed. The lower cladding layer (in conjunction with the upper cladding layer) confines a propagating optical signal within the composite guiding region. In some embodiments, the lower cladding layer comprises silicon dioxide. A more extensive list of suitable materials is provided later in this specification.

The lower portion of the outer core (e.g., layer 612) is deposited or grown on the lower cladding layer. This operation forms the bottom layer of composite guiding region 610. In some embodiments, after the lower portion of the outer core is deposited/grown, it is suitably patterned.

The material that forms the inner core (e.g., layer 614) is deposited or grown on the lower portion of the outer core. After deposition/growth, the material is appropriately patterned (e.g., for forming a stripe or ridge waveguide, etc.).

The outer core is completed with the deposition or growth of the side/upper portion of the outer core (e.g., layer 616). This material is appropriately patterned. The upper portion of the outer core advantageously conforms to the underlying topography of the lower portion of the outer core and the patterned inner core.

An upper cladding layer (e.g., layer 620) is deposited or grown on the upper portion of the outer core.

By removing the "side" portions of outer core 616 of box waveguide 600, a (double) stripe waveguide (not depicted) having an inner core and an outer core is formed.

Regarding materials selection, in some embodiments, stoichiometric materials are used to form composite guiding region 610. In some embodiments, layer 614 comprises silicon dioxide (preferably stoichiometric) deposited by tetraethylorthosilicate (TEOS) and layers 612 and 616 comprise silicon nitride (preferably stoichiometric). See, U.S. Pat. No. 7,146,087.

A more extensive list of materials that are suitable for use as the upper and lower cladding layers as well as the layers of the composite guiding region includes, but is not limited to, stoichiometric silicon nitride, silicon dioxide, silicon, polysilicon, silicon carbide, silicon monoxide, silicon-rich silicon nitride, indium phosphide, gallium arsenide, indium-gallium arsenide, indium-gallium arsenide-phosphide, lithium niobate, silicon oxy-nitride, phosphosilicate glass, and borophosphosilicate glass. In addition, compounds such as silicon nitride are effectively different materials with different material properties when their composition is other than stoichiometric, and these different material compounds can be used in combination in similar fashion to those listed above.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical system comprising:
 a first closed-loop, optically resonant, waveguiding structure;
 a second waveguiding structure including a first bus waveguide; and
 a first optical-coupling region, wherein the first optical-coupling region is defined as a region in which a first segment of the first waveguiding structure and a second segment of the second waveguiding structure are suitably close to support evanescent-field coupling therebetween, wherein the second segment includes at least a portion of the first bus waveguide, and further wherein:
 (a) the first segment and the second segment comprise substantially identical waveguiding characteristics;
 (b) the first segment and the second segment each include a portion that is not straight; and
 (c) the segments exhibit mirror symmetry with respect to each other across or about at least one of a first plane and a first axis.

2. The optical system of claim 1 wherein the first waveguiding structure and the second waveguiding structure are laterally optically coupled to one another.

3. The optical system of claim 1 wherein the first waveguiding structure has a circular form.

4. The optical system of claim 1 wherein the first waveguiding structure is optically resonant to light having a wavelength of about 850 nanometers or less.

5. The optical system of claim 1 wherein the first waveguiding structure and the second waveguiding structure each have the same configuration selected from the group consisting of a strip waveguide, a ridge waveguide, and a box waveguide.

6. The optical system of claim 1 wherein the first waveguiding structure and the second waveguiding structure each include a waveguide core having an inner core of stoichiometric silicon oxide (SiO2) and an outer core of stoichiometric silicon nitride (Si3N4).

7. The optical system of claim 1 further comprising:
 a third waveguiding structure including a second bus waveguide; and
 a second optical-coupling region, wherein the second optical-coupling region is defined as a region in which a third segment of the third waveguiding structure and a fourth segment of the first waveguiding structure are suitably close to support evanescent-field coupling therebetween, wherein the third segment includes at least a portion of the second bus waveguide and further wherein:
 (a) the third segment and the fourth segment comprise substantially identical waveguiding characteristics;
 (b) the third segment and the fourth segment each include a portion that is not straight; and
 (c) the third segment and the fourth segment exhibit mirror symmetry with respect to each other across or about at least one of a second plane and a second axis.

8. The optical system of claim 7 wherein optical system comprises a four-port micro-resonator, wherein:
 the first bus waveguide of the second waveguiding structure has an input port at a first end thereof and a through port at a second end thereof; and
 the second bus waveguide has an add port at a first end thereof and a drop port at a second end thereof.

9. The optical system of claim 7 wherein a resonant frequency of the first waveguiding structure is about 850 nanometers or less.

10. The optical system of claim 1 wherein a width of the first waveguiding structure and a width of the second waveguiding structure are equal.

11. An optical system comprising:
 a first optical-coupling region that couples light, via evanescent field coupling, between a first closed-loop, optically resonant, waveguiding structure and a first bus waveguide, wherein:
 the first optical-coupling region comprises a first segment from the first waveguiding structure and a second segment from the first bus waveguide;
 the first segment and the second segment exhibit mirror symmetry with respect to each other across or about at least one of a plane and an axis; and
 the first segment and the second segment each include a portion that is not straight; and
 a second optical-coupling region that couples light, via evanescent field coupling, between the first waveguiding structure and a second bus waveguide, wherein:
 the second optical-coupling region comprises a third segment from the first waveguiding structure and a fourth segment from the second bus waveguide.

12. The optical system of claim 11 wherein the first segment and the second segment comprise substantially identical waveguiding characteristics.

13. The optical system of claim 11 wherein:
 the first bus waveguide has an input port at a first end thereof and a through port at a second end thereof; and
 the second bus waveguide has an add port at a first end thereof and a drop port at a second end thereof.

14. The optical system of claim 11 and wherein the third segment and the fourth segment exhibit mirror symmetry with respect to each other across or about at least one of a plane and an axis.

15. The optical system of claim system of claim 11 wherein the first waveguiding structure and the first bus waveguide are laterally optically coupled to one another.

16. The optical system of claim 11 wherein the first waveguiding structure and the first bus waveguide each include a waveguide core having an inner core of stoichiometric silicon oxide (SiO2) and an outer core of stoichiometric silicon nitride (Si3N4).

17. A method for coupling light between a first closed-loop, optically resonant, waveguiding structure and a second waveguiding structure that is not optically resonant, wherein the method comprises:
    launching light into the second waveguiding structure; and
    coupling light from the second waveguiding structure to the first waveguiding structure via evanescent-field coupling, wherein, within the region where the light couples:
    (a) the first waveguiding structure and the second waveguiding structure exhibit mirror symmetry with respect to each other across or about at least one of a plane and an axis; and
    (b) each of the first waveguiding structure and the second waveguiding structure include a portion that is not straight.

18. The method of claim 17 wherein the coupled light has a wavelength that is the same as a wavelength at which the first waveguiding structure is resonant.

19. The method of claim 17 further comprising dropping the coupled light from a drop port on a third waveguiding structure.

* * * * *